United States Patent
Hilbig et al.

(10) Patent No.: US 9,504,953 B2
(45) Date of Patent: Nov. 29, 2016

(54) OXYGEN SEPARATOR AND METHOD OF GENERATING OXYGEN

(71) Applicant: KONINKLIJKE PHILIPS N.V., Eindhoven (NL)

(72) Inventors: Rainer Hilbig, Aachen (DE); Achim Gerhard Rolf Koerber, Eindhoven (NL); Paul Van Der Sluis, Eindhoven (NL); Mareike Klee, Straelen (DE); Wilhelmus Cornelis Keur, Weert (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 12 days.

(21) Appl. No.: 14/397,773

(22) PCT Filed: Apr. 22, 2013

(86) PCT No.: PCT/IB2013/053172
§ 371 (c)(1),
(2) Date: Oct. 29, 2014

(87) PCT Pub. No.: WO2013/164728
PCT Pub. Date: Nov. 7, 2013

(65) Prior Publication Data
US 2015/0128801 A1      May 14, 2015

Related U.S. Application Data

(60) Provisional application No. 61/642,502, filed on May 4, 2012.

(51) Int. Cl.
*B01D 53/047* (2006.01)
*A62B 21/00* (2006.01)
(Continued)

(52) U.S. Cl.
CPC ............... *B01D 53/02* (2013.01); *A62B 19/00* (2013.01); *B01D 53/047* (2013.01);
(Continued)

(58) Field of Classification Search
CPC ............... B01D 53/02; B01D 53/047; B01D 2253/108; B01D 2253/1085; B01D 2256/12; B01D 2257/102; A62B 19/00; C01B 13/0259
USPC .......... 95/96–98, 104–106, 130, 148; 96/121
See application file for complete search history.

(56) References Cited

U.S. PATENT DOCUMENTS 4,197,095 A * 4/1980 White, Jr. .......... B01D 53/0454
                                                            95/122
4,810,265 A    3/1989 Lagree
(Continued)

FOREIGN PATENT DOCUMENTS

CN    2643985        9/2004
CN    1748838 A      3/2006
(Continued)

OTHER PUBLICATIONS

Shen D. et al., "Thermodynamics of Nitrogen and Oxygen Sorption on Zeolites LiLSX and CaC", Microporous and Mesoporous Materials, 2001, vol. 48, pp. 211-217.
(Continued)

*Primary Examiner* — Frank Lawrence
(74) *Attorney, Agent, or Firm* — Michael W. Haas

(57) ABSTRACT

The invention relates to a method of separating oxygen from an oxygen comprising gas, the method comprising the steps of: performing at least a first and a second period of oxygen separation, the first and the second period of oxygen separation each comprising the steps of guiding an oxygen comprising gas to the primary side of an oxygen separation device (12, 14), the oxygen separation device (12, 14) comprising an oxygen separation sorbent (16, 18), and generating a flow of oxygen enriched gas out of the oxygen separation device (12, 14) by creating a pressure difference between the primary side and the secondary side of the oxygen separation device (12, 14), and performing a cooling period between the first and the second period of oxygen separation, wherein the cooling period comprises the steps of guiding a flushing sorbate through the oxygen separation device (12, 14), the flushing sorbate having an adsorption energy $e_1$ with respect to the oxygen separation sorbent (16, 18), and guiding a cooling sorbate through the oxygen separation device (12, 14), the cooling sorbate having an adsorption energy $e_2$ with respect to the oxygen separation sorbent (16, 18), wherein the adsorption energy $e_2$ is lower with respect to the adsorption energy $e_2$. Such a method provides an improved oxygen separation behavior especially with respect to high temperatures. The present invention further relates to an oxygen separator (10).

9 Claims, 3 Drawing Sheets

(51) Int. Cl.
*B01D 53/02* (2006.01)
*A62B 19/00* (2006.01)
*C01B 13/02* (2006.01)

(52) U.S. Cl.
CPC .... *C01B 13/0259* (2013.01); *B01D 2253/108* (2013.01); *B01D 2253/1085* (2013.01); *B01D 2256/12* (2013.01); *B01D 2257/102* (2013.01)

(56) References Cited

U.S. PATENT DOCUMENTS

| | | | |
|---|---|---|---|
| 4,832,711 A * | 5/1989 | Christel, Jr. | B01D 53/0454 95/105 |
| 4,915,711 A | 4/1990 | Kumar | |
| 4,971,609 A | 11/1990 | Pawlos | |
| 5,032,150 A | 7/1991 | Knaebel | |
| 5,258,060 A | 11/1993 | Gaffney | |
| 5,407,465 A * | 4/1995 | Schaub | B01D 53/0476 95/101 |
| 6,551,384 B1 | 4/2003 | Ackley | |
| 2006/0048644 A1 | 3/2006 | Dolensky | |
| 2006/0230929 A1 | 10/2006 | Bliss | |
| 2007/0227360 A1 | 10/2007 | Atlas | |
| 2009/0065007 A1 | 3/2009 | Wilkinson | |

FOREIGN PATENT DOCUMENTS

| | | |
|---|---|---|
| CN | 1799988 A | 7/2006 |
| CN | 2917756 | 7/2007 |
| WO | WO2004004860 A2 | 1/2004 |
| WO | WO2011011432 A2 | 1/2011 |

OTHER PUBLICATIONS

Mathias et al., "Correlation of Multicomponent Gas Adsorption by the Dual-Site Langmuir Model. Application to Nitrogen/Oxygen Adsorption on 5A-Zeolite", Ind. Eng. Chem. Res., 1996, 35 (7), pp. 2477-2483.

* cited by examiner

OXYGEN SEPARATOR AND METHOD OF GENERATING OXYGEN

CROSS-REFERENCE TO RELATED APPLICATIONS

This patent application claims the priority benefit under 35 U.S.C. §371 of international patent application no. PCT/IB2013/053172, filed Apr. 22, 2013, which claims the priority benefit under 35 U.S.C. §119(e) of U.S. Provisional Application No. 61/642,502 filed on May 4, 2012, the contents of which are herein incorporated by reference.

FIELD OF THE INVENTION

The invention relates to the field of oxygen separation. More specifically, the invention relates to oxygen separation for therapeutic applications, particularly in the field of home care.

BACKGROUND OF THE INVENTION

Oxygen therapy is the administration of oxygen as a therapeutic modality. It is widely used for a variety of purposes in both chronic and acute patient care as it is essential for cell metabolism, and in turn, tissue oxygenation is essential for all physiological functions. Oxygen therapy should be used to benefit the patient by increasing the supply of oxygen to the lungs and thereby increasing the availability of oxygen to the body tissues, especially when the patient is suffering from hypoxia and/or hypoxemia. Oxygen therapy may be used both in applications in hospital or in home care. The main home care application of oxygen therapy is for patients with severe chronic obstructive pulmonary disease (COPD).

Oxygen may be administered in a number of ways. A preferable way of oxygen administration is by using a so called on demand generation of oxygen. Referring to this, commercial solutions, so-called oxygen concentrators or separators, respectively, are widely known. These oxygen concentrators mostly separate oxygen from an oxygen comprising gas, so that the oxygen is provided on demand, i.e. directly before use.

A task of such oxygen concentrators, or oxygen separators, respectively, known in the art is to deal with the temperature dependency of the oxygen separation capacity of the respective oxygen separation sorbent.

Known from US 20060048644 A1 is a pressure swing adsorption system. Such a pressure swing adsorption system comprises an air supply; a compressor for receiving and compressing the air supply, providing a compressed air supply; and less than six molecular sieve chambers having molecular sieve material therewithin for separating the compressed air supply into a concentrated gas component; wherein the system has a recovery rate of the concentrated gas component of greater than approximately 30%. In order to deal with compressed air having a higher temperature than ambient air, the compressed air according to this document travels along the length of a multi-chamber canister which acts as a heat exchange for cooling compressed air prior to delivery to a respective molecular sieve.

There is, however, still the need for improving the oxygen separation performance of oxygen separation devices especially with respect to temperature influence and especially with regard to storing or using an oxygen separator at highly elevated temperatures.

SUMMARY OF THE INVENTION

It is an object of the present invention to provide an oxygen separator and a method of separating oxygen from an oxygen comprising gas which is cost-saving to build, easy to perform, and/or which is advantageous with respect to separation efficiency.

This object is achieved by a method of separating oxygen from an oxygen comprising gas according to the disclosure. This object is furthermore achieved by an oxygen separator according to the disclosure. Preferred embodiments are defined in the dependent claims.

A method of separating oxygen from an oxygen comprising gas, comprises the steps of: performing at least a first and a second period of oxygen separation, the first and the second period of oxygen separation each comprising the steps of guiding an oxygen comprising gas to the primary side of an oxygen separation device, the oxygen separation device comprising an oxygen separation sorbent, and generating a flow of oxygen enriched gas out of the oxygen separation device by creating a pressure difference between the primary side and the secondary side of the oxygen separation device, and performing a cooling period between the first and the second period of oxygen separation, wherein the cooling period comprises the steps of guiding a flushing sorbate through the oxygen separation device, the flushing sorbate having an adsorption energy $e_1$ with respect to the oxygen separation sorbent, and guiding a cooling sorbate through the oxygen separation device, the cooling sorbate having an adsorption energy $e_2$ with respect to the oxygen separation sorbent, wherein the adsorption energy $e_2$ is lower with respect to the adsorption energy $e_1$.

The term oxygen comprising gas, as used herein, may refer to any gas which at least partly comprises gaseous oxygen, or which consists of oxygen. The term oxygen enriched gas shall thereby particularly mean a gas which has a higher concentration with respect to oxygen compared to the oxygen comprising gas and which may in an extreme case be pure oxygen.

The term oxygen separation device may particularly refer to the active part of an oxygen separator. It may for example comprise an oxygen separation sorbent which may interact with an oxygen comprising gas, or with defined constituents of the latter with the exception of oxygen, and may thus separate oxygen from the oxygen comprising gas by means of interaction with at least one constituent of the oxygen comprising gas apart from oxygen. Consequently, the oxygen separation device as such, or its oxygen separation sorbent, respectively, is capable of separating oxygen from an oxygen comprising gas particularly by sorption processes, such as adsorption processes. It may thus be designed as or comprise an adsorber bed, or sieve bed, respectively.

An oxygen separation sorbent may furthermore be understood as a material which sorbs and thus adsorbs or absorbs at least one substance from the oxygen comprising gas except oxygen, or better than oxygen, respectively.

Furthermore, the term primary side of the oxygen separation device, as used herein, may refer to the side or the part of the oxygen separation device being directed towards the direction, at which the oxygen comprising gas is guided to the oxygen separation device, whereas the term secondary side of the oxygen separation device, as used herein, may refer to the side or the part of the oxygen separation device being directed towards the opposite side, i.e. to the side at which the generated pure oxygen or oxygen enriched gas is present.

A period of oxygen separation may furthermore be understood as a period having as object to generate oxygen enriched gas and thus the period between starting an oxygen separation process in response to turning on an oxygen separator and finishing an oxygen separation process in response to turning off the oxygen separator. Turning on and turning off an oxygen separator may thereby be understood as the indication of a user, for example by pressing a button, that the oxygen separator should be set in an on-mode or in an off mode. Consequently, such a period may comprise generating a flow of oxygen enriched gas but under circumstances as well regenerating the oxygen separation sorbent by guiding a regeneration gas through the oxygen separation device from its secondary side to its primary side in order to desorb substances being adsorbed during oxygen separation. An oxygen separation period may as well be understood as a complete cycle of oxygen generation, starting with a pressurizing and feed phase as oxygen separation step and ending with depressurizing and purge phase as regeneration step. It is obvious for one skilled in the art that in case two oxygen separation devices are in use, the second one is delayed by half a cycle with respect to the first one.

A flushing sorbate may furthermore be understood as a substance, such as a gas, which binds to the oxygen separation sorbent with a defined adsorption energy $e_1$. Correspondingly, the cooling sorbate may particularly mean a sorbate which binds to the oxygen separation sorbent with an adsorption energy $e_2$. With respect to the adsorption energies, $e_2$ should be lower compared to $e_1$ resulting in a cooling effect when the cooling sorbate is bound to the oxygen separation sorbent and replaces the flushing sorbate.

A method of separating oxygen from an oxygen comprising gas thus provides improved separation efficiency especially in case the oxygen separator used for performing this method is stored at least temporarily at high temperatures or is used at high temperatures. Especially, the method according to the invention addresses the impact of high working temperatures as well as storage temperatures of the oxygen separation sorbent with respect to the performance such as oxygen purity of an oxygen separation device.

In detail, the method according to the invention is based on the finding, that by at least partly binding or sorbing a substance to the oxygen separation sorbent and thus by fully or only to some extent loading the oxygen separation sorbent with a substance having a defined adsorption energy (flushing sorbate), the oxygen separation sorbent may be cooled by replacing the flushing sorbate by means of a cooling sorbate having a respective lower binding energy, or adsorption energy, respectively. This does in this case lead to an instantaneous cooling of the oxygen separation sorbent due to the fact that removing the strongly bound flushing sorbate does require more energy than forming weaker bonds with the cooling sorbate. The difference in energy thereby causes a cooling effect.

Due to the cooling effect, the oxygen separation efficiency may significantly be improved due to the fact that the sorbing properties of the oxygen separation sorbent are mostly strongly dependent from its temperature. In detail, the temperature performance may be deduced from the respective isotherms. As exemplary values only, by using the temperature dependent isotherms for nitrogen and oxygen from a Li-LSX zeolite material as oxygen separation sorbent, the increase M % ($\Delta T$) of the minimum amount of the oxygen separation sorbent required may be calculated with respect to the amount that is needed to come up with an oxygen flux of 1 l/min with a purity of more than 85% concentrated from air at sieve temperature. Relative to room temperature operation (To ~23° C.), a temperature increase of the oxygen separation sorbent of $\Delta T=+20°$ C. results with an increase of the (minimum) needed material of M % ($\Delta T=20°$ C.) of about 40%; a temperature increase of the oxygen separation sorbent of $\Delta T=+30°$ C. results with M % ($\Delta T=30°$ C.) about 65%. Approximately the double amount of sorbent is needed for $\Delta T=40°$ C.

As a result, when having a given amount of sorbent material such as inside the oxygen separation device, often special properties may only be secure in a defined temperature range. In case that temperature range is left, for example exceeded, the defined properties may vary which may under some circumstances lead to an undesired deterioration of the oxygen separation capacity and thus to a deteriorated quality of oxygen enriched gas.

This may be the case especially for portable oxygen separators due to the fact that this kind of devices may be very sensitive to working at elevated temperatures due to the limited amount of oxygen separation sorbent. For example, a respective oxygen separation device may comprise 300 $cm^3$ of Li-sieve material which corresponds to a mass of 200 g only. Such a limited amount of oxygen separation sorbent generally may provide advantages with respect to cost as well as size and weight and thus comfort of the respective system. Especially for portable devices a method according to the invention may thus prevent to provide a higher mass of oxygen separation sorbent in order to securely realize fulfilling the oxygen purity specifications.

The above may be the case even if the oxygen concentrator is only stored at temperatures significantly higher than normal room temperatures and then switched on at about room temperatures (T ~25° C.). The reason for this is the high heat capacity of the oxygen separation sorbent such as of a respective zeolite relative to the capacity of the surrounding gas and the low heat conductance within the oxygen separation device especially in case the oxygen separation sorbent is designed as a sieve bead. Even an operation of the system under normal operating conditions (normal air feed flow) will thus not result in a quick cooling, but may lie in the region of minutes of gas flow through the oxygen separation material.

In contrast thereto, by adequately choosing the respective flushing sorbate as well as cooling sorbate especially by means of their adsorption energies or the ratio of their respective adsorption energies, according to the invention, the oxygen separation sorbent may effectively and instantaneously be cooled. This results in a fast decrease of oxygen separation sorbent temperature as well as in a fast increase of oxygen separation performance. In other words, according to the invention it becomes possible to quickly cool down the oxygen separation sorbent even after storage at high temperatures and to quickly provide the desired oxygen separation specifications, or oxygen purity, respectively. Accordingly, it becomes possible to use a method according to the invention during a normal working procedure between two working periods especially in case an oxygen separator is used at high temperatures.

The above may be realized furthermore in a very limited time scale due to the fact that the sorbent material cools down instantaneously and thus very quickly. This cooling step furthermore is not based on interaction with a cooling device being located outside the oxygen separation sorbent, but contrary thereto a cooling effect is realized from the surface as well as from the inside of the sorbent material bed, for example, due to the fact that the cooling sorbate interacts with all sorbent particles comprised in the oxygen separation device in a very uniform manner. Apart from that, the step of guiding the flushing sorbate as well as the cooling sorbate through the oxygen separation sorbent may be realized in a time scale of seconds, even more showing the quick cooling procedure and thus the quick increase of the quality of generated oxygen. As exemplary values only, for each 100 g of oxygen separation sorbent, a time scale of 5 to 10 seconds may be appropriate for guiding a cooling sorbate there through in order to achieve the desired temperature decrease.

According to an embodiment the flushing sorbate comprises nitrogen and/or the cooling sorbate comprises oxygen, or rare gases such as argon or helium. These sorbate materials are especially easy and cost-saving to get and furthermore easy to handle. Apart from that all sorbates may bind to the same sorbents resulting in a very easy and cost-saving arrangement of the oxygen separation device, or its oxygen separation sorbent, respectively. Additionally, these sorbates have respective adsorptions energies at a plurality of sorbents which vary in a broad range so that even by exchanging only a few amount of nitrogen by oxygen, for example, a very efficient and quick cooling effect may be provided resulting in an especially advantageous oxygen separation performance.

According to a further embodiment the flushing sorbate and/or the cooling sorbate are generated during an oxygen separation period and/or during a cooling period. This embodiment allows arranging an oxygen separator for performing the method according to the invention without the need of externally refilling potentially present containers or tanks with the respective flushing sorbate and/or cooling sorbate. This allows an especially cost-saving performance of the method according to the invention according to this embodiment. Furthermore, a very safe method may be performed due to the fact that no flushing sorbates and/or cooling sorbates have to be stored or may become empty. This embodiment may be particularly suitable in case the flushing sorbate comprises nitrogen and/or the cooling sorbate comprises oxygen. In detail, oxygen is generated by the method according to the invention in any case. The generated oxygen may therefore be guided in a container and may be used therefrom in order to apply the flushing sorbate. The respective container may be the same container which may be used for applying the generated oxygen to the application of choice or it may be a separated container. Additionally, nitrogen is mostly sorbed to the oxygen separation sorbent during the standard working procedure in order to generate oxygen. Consequently, by trapping this nitrogen, for example, by guiding the gas used for a regeneration step of the oxygen separation sorbent from the oxygen separation device to a gas container, nitrogen may be generated and used for cooling the oxygen separation sorbent. For example, the flushing sorbate and/or the cooling sorbate may be generated when or after turning off the oxygen separator. This may be realized by performing an extra oxygen separation step, for example after turning the oxygen separator off.

According to a further embodiment the step of guiding the flushing sorbate through the oxygen separation device is performed immediately after turning off an oxygen separator used for the method according to the invention. According to this embodiment, the oxygen separation sorbent may be flushed, for example with nitrogen such as with air, as a last measure after the user indicated that the oxygen separator should be turned off and thus after an oxygen separation period and before the oxygen separator is switched into an off-mode, for example for storing the oxygen separator in an off-mode. This may thus be realized, for example, in an additional step after a user indicated that the oxygen separator has to be turned off and thus the normal oxygen separation period ends. Consequently, this measure strictly counteracts the procedure generally known for pressure swing adsorption systems, for example. According to these known procedures, it should strictly be avoided to load or even to saturate the oxygen separation sorbent with nitrogen, for example, at the end of an oxygen separation period because this measure reduces the oxygen separation capacity at a following cycle. Because of this, known measures often comprise the step of guiding oxygen through the oxygen separation device for regeneration purposes. According to the invention however, the oxygen separator is ready for cooling down the oxygen separation sorbent before beginning a following oxygen separation period.

According to a further embodiment the oxygen separation sorbent is loaded with flushing sorbate in an amount of more than 3 wt.-‰. This embodiment secures to generate a sufficient cooling effect due to the fact that a sufficient amount of flushing sorbate is present and may be replaced by cooling sorbate. It may thereby be advantageous not to fully load the oxygen separation sorbent with flushing sorbate. This allows to both directly start a new oxygen separation period or to replace the flushing sorbate by a cooling sorbate and thus to cool down the oxygen separation sorbent. Which procedure will follow may be dependent from the respective requirements. According to this embodiment an especially broad variety of applications may be provided and maintenance and comfort are especially improved.

According to a further embodiment the step of guiding a cooling sorbate through the oxygen separation device is performed immediately after turning on an oxygen separator used for the method according to the invention. Particularly, the step of guiding a cooling sorbate through the oxygen separation device may be performed as very first step in response to the indication of a user to turn on an oxygen separation device after an off-time and thus between an off-time of the oxygen separator and the start of an oxygen separation period. This embodiment allows cooling the oxygen separation sorbent directly before starting an oxygen generation period and thus when it is strictly needed. The oxygen separation capacity and thus the quality of the generated oxygen may thus especially effectively be improved according to this embodiment. A beginning of the cooling period with following oxygen separation period may thereby particularly start after long off-times of a respective oxygen separator and after storage at elevated temperatures, or before a defined cycle during an oxygen separation procedure when performing the oxygen separation method at elevated temperatures.

It is thus apparent that the cooling period, or the respective steps of the latter, may be separated by an off-period of the oxygen separator and do thus not have to be performed directly one after the other.

According to a further embodiment the step of guiding the flushing sorbate through the oxygen separation device and/or the step of guiding the cooling sorbate through the oxygen separation device is performed in dependence of the oxygen separation sorbent temperature. This embodiment allows cooling down the oxygen separation sorbent only in case it is required. For example, in case the temperature, which may be detected by a temperature sensor, is within the limits of the oxygen separation specifications of the respective used oxygen separator, or oxygen separation sorbent, no cooling is performed allowing an especially effective oxygen generation. If, however, the temperature e.g. is too high and may exceed defined values, the oxygen separation sorbent may selectively by cooled down in order to quickly reach the required temperature. This embodiment may particularly be performed, for example, in combination with only partly loading the oxygen separation sorbent with a flushing sorbate because this especially allows starting with an oxygen generation step or with a cooling step whatever is required. Additionally, this embodiment may be used in combination with optionally performing the cooling step immediately before starting an oxygen separation period and thus particularly when or after turning on an oxygen separator because in this case the temperature being present at the oxygen separation sorbent may be detected in real time making the method especially effective. Exemplary temperatures which may activate a cooling step according to the method according to the invention may lie in the range of 40° C. or even higher. The defined temperatures may thereby be chosen in dependence of the used oxygen separation sorbent and the substance to be sorbed.

With respect to further advantages and technical features of the method of generating oxygen it is referred to the description of the oxygen separator, the figures and the description of the figures.

The present invention further relates to an oxygen separator, comprising at least one oxygen separation device with an oxygen separation sorbent, having a gas inlet at a primary side for guiding a flow of oxygen comprising gas into the oxygen separation device and having a gas outlet at a secondary side for guiding a flow of oxygen enriched gas out of the oxygen separation device, and a pressure adjusting device for creating a pressure difference between the primary side and the secondary side of the oxygen separation device, wherein the oxygen separator comprises a control unit being adapted for guiding a flushing sorbate through the oxygen separation device between two oxygen generation periods, the flushing sorbate having an adsorption energy $e_1$ with respect to the oxygen separation sorbent, and being adapted for guiding a cooling sorbate through the oxygen separation device, between two oxygen generation cycles, the cooling sorbate having an adsorption energy $e_2$ with respect to the oxygen separation sorbent, wherein the adsorption energy $e_2$ is lower with respect to the adsorption energy $e_1$.

The term oxygen separator as used herein may particularly refer to a device which is capable of separating oxygen from an oxygen comprising gas. Consequently, by means of an oxygen separator, starting from an oxygen comprising gas, pure or essentially pure oxygen and thus oxygen enriched gas may be generated.

The term pressure adjusting device may refer to any device which is capable of generating a pressure difference between the primary side and the secondary side of the oxygen separation device. It may for example be a gas compression device being connected to the primary side of the oxygen separation device, or a vacuum pump being connected to the secondary side of the oxygen separation device.

This oxygen separator enables to quickly cool down the temperature of an oxygen separation sorbent especially at a start of an oxygen separation period or after turning on an oxygen separator, respectively. In detail, the control unit may be provided with a control system, such as a microprocessor, which serves for guiding a flushing sorbate or a cooling sorbate through the oxygen separation device. This may be realized, for example, by controlling respective valves of respectively filled gas containers and conducts, for example.

Additionally, there may be provided a single oxygen separation device, or there may be provided two or even more than two oxygen separation devices. In detail, the oxygen separator may be designed, when comprising two or more oxygen separation devices, as a pressure swing adsorption system (PSA system), as it is generally known in the art.

Consequently, an oxygen separator according to the invention serves for improvements with respect to oxygen separation behavior particularly after storage at high temperatures and/or with oxygen separation procedures at high temperatures.

According to an embodiment the oxygen separator comprises a sensor for detecting the temperature of the oxygen separation sorbent. This embodiment allows cooling down the oxygen separation sorbent only in case it is required. For example, in case the temperature is within the limits of the oxygen separation specifications of the respective used oxygen separator, or oxygen separation sorbent, no cooling is required allowing an especially effective oxygen generation. If, however, the temperature is e.g. too high and thus exceeds defined values, the oxygen separation sorbent may selectively be cooled down in order to quickly reach the required temperature.

According to a further embodiment the oxygen separator comprises a container for accommodating the flushing sorbate and/or a container for accommodating the cooling sorbate. This embodiment allows the oxygen separator to be self-sufficient and does thus not need any connections to immobile devices. It is apparent that this embodiment may be especially advantageous in case batteries or generators are provided and furthermore air is used as oxygen comprising gas. Furthermore, this embodiment is especially advantageous with respect to portable devices. Additionally, this embodiment may be especially advantageous in case the flushing sorbate and/or the cooling sorbate are generated during the step of using the oxygen separator.

According to a further embodiment the oxygen separation sorbent comprises a Li-LSX zeolite, such as the one being purchasable under the name SXSDM from CECA or OxySiv MDX from UOP. According to this embodiment an oxygen separation sorbent may be used which has an especially high adsorption strength. Consequently, according to this embodiment an especially effective cooling effect may be used making the oxygen separation behavior of an oxygen separator according to this embodiment especially effective. A Li-LSX zeolite may thereby particularly be a Li exchanged Low Silica X zeolite (LSX, SiAl=1). They may, for example, be prepared from Na-LSX zeolites via ion-exchange methods. Zeolite X thereby refers to zeolites with SiAl ratios between 1 and 1.5.

With respect to further advantages and technical features of the oxygen separator it is referred to the description of the method of generating oxygen, the figures and the description of the figures.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Figure 1:
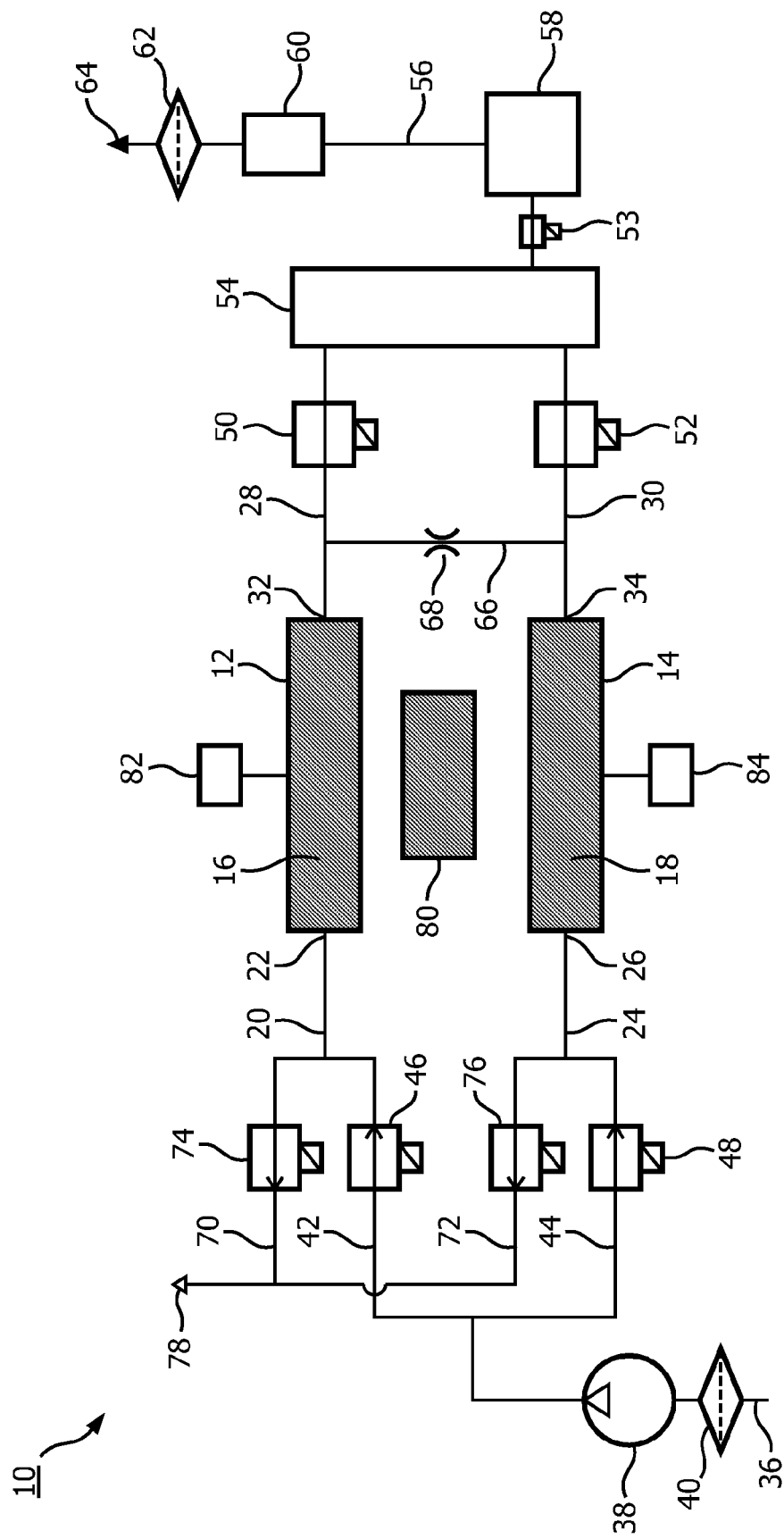
FIG. 1 shows a schematic view of an embodiment of an oxygen separator according to the invention for performing the method according to the invention.

In FIG. 1, an oxygen separator 10 for generating oxygen is schematically shown. The oxygen separator 10 may be used for generating oxygen with respect to therapeutic applications, for example in the field of COPD treatment. The oxygen separator 10 may be designed as a stationary arrangement, for example for using it in a hospital, or it may be a portable device, for example for using it in the field of homecare applications. However, the oxygen separator 10 may furthermore be used for any application at which pure or essentially pure oxygen has to be provided, for example in air planes or for welding purposes. Such an oxygen concentrator, or oxygen separator 10, respectively, may be based on an oxygen concentrator such as the one called EverGo and which is purchasable from Philips Respironics.

The oxygen separator 10 comprises at least one oxygen separation device 12 which is capable of separating oxygen from an oxygen comprising gas. However, it is preferred that the oxygen separator 10 comprises at least two oxygen separation devices 12, 14 being arranged in parallel. In the following, the invention is described with respect to two oxygen separation devices 12, 14. However, it is clear for one skilled in the art that every feature may be provided correspondingly by using just one oxygen separation device 12 or more than two oxygen separation devices 12, 14. Each oxygen separation device 12, 14 may be formed as a sieve bed and may be equipped with an oxygen separation sorbent 16, 18. The oxygen separation sorbent 16, 18 is particularly configured for letting oxygen pass in a great amount especially in case it is in contact with the oxygen separation sorbent in limited concentrations but for interacting with, or adsorbing, respectively other components or at least one other component being present in an oxygen comprising gas. In case air is used as oxygen comprising gas, it is thus preferred that the oxygen separation material 16, 18 is configured for adsorbing nitrogen but less interacting with oxygen. Suitable oxygen separation materials 16, 18 may comprises a zeolite material such as a lithium faujasite material. However it may be possible to use every suitable oxygen separation material 16, 18 known in the art, for example for use in swing processes, such as pressure swing adsorption ore vacuum swing adsorption processes.

An inlet conduct 20 is provided for guiding a flow of oxygen comprising gas to the gas inlet 22 of the oxygen separation device 12 at its primary side. Correspondingly, an inlet conduct 24 is provided for guiding a flow of oxygen comprising gas to the gas inlet 26 of the oxygen separation device 14 at its primary side, respectively. Furthermore, outlet conducts 28, 30 for guiding oxygen enriched gas, or pure oxygen, respectively, out of the oxygen separation devices 12, 14 are connected to gas outlets 32, 34 of the respective oxygen separation devices 12, 14.

The inlet conducts 20, 24 of the oxygen separation devices 12, 14 are connected to an inlet 36 of the oxygen separator 10. Connected to the inlet 36 may be a source of oxygen comprising gas, such as a gas storing device or the air surrounding the oxygen separator 10. Additionally, a pressure adjusting device for creating a pressure difference between the primary side and the secondary side of the oxygen separation device 12, 14 may be provided. According to FIG. 1, a compressor 38 is provided for compressing the oxygen comprising gas and forcing it through inlet conducts 42, 44, which may be part of or connected to the inlet conducts 20, 24, to the oxygen separation devices 12, 14. Downstream or upstream the compressor 38, an inlet filter 40 may be provided in order to provide a first cleaning step of the oxygen comprising gas. In detail, especially solid particles may be filtered out of the oxygen comprising gas.

In order to allow the oxygen comprising gas to be guided through the oxygen separation devices 12, 14 intermittently, inlet valves 46, 48 may be provided in the inlet conducts 42, 44. A valve according to the invention shall be any device which may allow a gas flow, inhibit a gas flow and/or regulate the amount of a gas flow. Consequently, by closing the valve 48 and by opening the valve 46, the oxygen comprising gas may be guided through the first oxygen separation device 12, whereas the oxygen comprising gas may be guided through the second oxygen separation device 14 by opening the valve 48 and by closing the valve 46. Correspondingly, a valve 50 may be provided in the outlet conduct 28 and a valve 52 may be provided in the outlet conduct 30. By guiding the oxygen comprising gas through the first oxygen separation device 12, the valve 50 may be opened whereas the valve 52 may be closed. Correspondingly, by guiding the oxygen comprising gas through the second oxygen separation device 14, the valve 52 may be opened whereas the valve 50 may be closed.

Downstream the valves 50, 52, the outlet conducts 28, 30 are connected to an oxygen accumulator 54, or a gas tank, respectively, in order to store the generated oxygen, or oxygen enriched gas, respectively. The oxygen accumulator 54 may be connected to an outlet line 56 in which a flow controller 58 may be provided in order to control a stream of oxygen enriched gas. Apart from that, a purity sensor 60 may be provided in the outlet line 56 in order to monitor the purity of the generated oxygen enriched gas. Furthermore, an additional filter 62 may be provided in the outlet line 56 before the generated oxygen is guided to an outlet 64. From the outlet 64, the generated oxygen comprising gas may be guided to the desired application, such as to a patient. Additionally, a valve 53 may be provided in the outlet line 56, downstream the accumulator 54 in order to hold the pressure after a shutdown of the oxygen separator 10.

The outlet conduct 28 of the first oxygen separation device 12 and the outlet conduct 30 of the second oxygen separation device 14 may be connected by a cross conduct 66 upstream the valves 50, 52, in which a flow regulator 68, such as an orifice or a flow controller, may be provided. This allows guiding a defined part of the generated oxygen enriched gas, for example generated in the oxygen separation device 12, 14, back through the further oxygen separation device 14,12, or vice versa, for regeneration purposes of the oxygen separation devices 12, 14. Alternatively, oxygen enriched gas may be guided through the oxygen separation devices 12, 14 coming from the accumulator 54. With this regard, regeneration lines 70, 72 are provided at the primary sides of the oxygen separation devices 12, 14, each comprising a valve 74, 76. If oxygen is guided through the oxygen separation devices 12, 14, from their secondary side to their primary side for regeneration purposes, for example in case the generated oxygen has limited purity, the outflow may then be guided selectively through the regeneration lines 70, 72 and through an exhaust 78.

An oxygen separator 10 like described above furthermore comprises a control unit 80. The control unit 80 is adapted for guiding a flushing sorbate and a cooling sorbate through the oxygen separation device 12, 14 between two oxygen generation periods like will be described down below. It may therefore be connected to the valves 46, 48, 50, 52, 53, 74, 76 and the compressor 38, for example and control the latter devices. In dependence from the flushing sorbate and cooling sorbate used, the respective sorbent may be guided through the oxygen separation devices 12, 14 either from the primary side to their secondary side or from their secondary side to their primary side.

Additionally, a sensor 82, 84 for detecting the temperature of the oxygen separation sorbent 16, 18, which may in an exemplary manner be a sieve bed comprising exemplarily a Li-LSX zeolite, may be provided.

An oxygen separator 10 like described above may be used for a method of separating oxygen from an oxygen comprising gas. The method may comprise the following steps. At least two respective periods of oxygen separation may be performed. Each of these periods comprises the steps of guiding an oxygen comprising gas, such as air, to the primary side of the oxygen separation device 12, 14, the oxygen separation device 12, 14 comprising the oxygen separation sorbent 16, 18. Thereby, a flow of oxygen enriched is generated and guided gas out of the oxygen separation device 12, 14 by creating a pressure difference between the primary side and the secondary side of the oxygen separation device 12, 14, for example by the compressor 38. Between the respective periods, the oxygen separator may be stored in an off-mode, for example at high temperatures such as at temperatures at or above 40° C.

Between the first and second oxygen separation period like described above, a flushing sorbate is guided through the oxygen separation device 12, 14, the flushing sorbate having an adsorption energy $e_1$ with respect to the oxygen separation sorbent. The flushing sorbate may comprise nitrogen and in an exemplary manner air may be used. The step of guiding the flushing sorbate through the oxygen separation device 12, 14 may furthermore be performed when ending an oxygen separation period and thus, for example, after a user turns off the oxygen separator or indicates the latter. Additionally, the step of guiding the flushing sorbate through the oxygen separation device 12, 14 may be performed in dependence on the loading behavior of the oxygen separation sorbent 16, 18. In detail, the oxygen separation sorbent 16, 18 may be loaded with flushing sorbate in an amount of more than 3 wt.-‰. Consequently, in case nitrogen is used as flushing sorbate and in case one of the oxygen separation devices 12, 14 comprises an oxygen separation sorbent having a loading behavior and thus a nitrogen sorbing capacity in the afore-mentioned range, the step of guiding the flushing sorbate may be performed solely with respect to the second oxygen separation device 14. Alternatively to guiding the flushing sorbate through one oxygen separation device 12, 14, only, both oxygen separation devices 12, 14 may be provided with the flushing sorbate.

This step may be realized, for example, by guiding air as nitrogen comprising gas by use of the compressor 38, through either one or both of the oxygen separation devices 12, 14. As an example, the valves 46, 76 may be opened whereas the valves 74, 50, 52, and 48 may be closed or the valves 48, 74 may be opened whereas the valves 46, 76, 50, 52 may be closed. This may allow guiding the nitrogen comprising gas through both of the oxygen separation devices 12, 14 in a serial manner. As a further measure, during off-time of the oxygen separator 10, the valves 74, 76 on the feed side towards the exhaust 78 may be opened to let an air flow into the oxygen separation devices 12, 14 at least for a few seconds in order to adsorb nitrogen at the oxygen separation sorbents 16, 18. The nitrogen content of the air may in this case be used as gas with higher heat of adsorbance and thus as flushing sorbate.

The step of guiding a flushing sorbate through the oxygen separation device 12, 14 may furthermore be realized, for example, by adding an extra phase during, or after, switching off the oxygen separator 10, or after a used indicated to turn the oxygen separator 10 off and thus as a last measure before the oxygen separator is turned in an off-mode. In detail, the step of guiding oxygen comprising gas through the oxygen separation devices 12, 14 may be elongated until the purity of the generated oxygen falls under a defined level such as under 70%. Until then the valves 50, 52 may be opened. The oxygen purity may be detected by the oxygen sensor 60. It may furthermore be preferred that an oxygen sensor is provided in each outlet 28, 30 due to the fact that the respective oxygen separation devices 12, 14 normally are in a different stages of loading. Consequently, one valve 50, 52 will be closed earlier compared to the further valve 52, 50.

The above defined extra phase, or following up cycle, respectively, may furthermore be controlled via a defined time cycle of a PSA process. In detail, after 25% of a cycle with respect to the first oxygen separation device 12 being in an oxygen separation mode, and thus after 75% of the cycle of the second oxygen separation device 14 being in a regeneration mode, a comparable stage of both oxygen separation devices with respect to nitrogen saturation may be reached. The moment of turning the oxygen separation device off and thus the closure of all valves may thus be realized via the operating time next to or additionally to the oxygen concentration like described above.

Furthermore, when switching off the oxygen separator 10, air may be guided through all oxygen separation devices 12, 14 thereby interrupting a potentially performed regeneration cycle, wherein the valves 46, 48 and 74, 76 may be opened whereas valves 50, 52 may be closed.

With respect to a further step of the method according to the invention, as well between the first and second period, a cooling sorbate is then guided through the oxygen separation device 12, 14, the cooling sorbate having an adsorption energy $e_2$ of the cooling sorbent with respect to the oxygen separation sorbent. With this regard, the adsorption energy $e_2$ is lower with respect to the adsorption energy $e_1$ of the flushing sorbate. This leads to an exchange of the flushing sorbate by the cooling sorbate and thus to a cooling effect acting on the oxygen separation sorbent 16, 18. The cooling sorbate may exemplarily comprise oxygen, or rare gases, such as helium or argon in a sufficient concentration in order to desorb the flushing sorbent. As an exemplary value, the concentration of the generated oxygen, which may lie in a range of 90% or even more, may be sufficient. Additionally, the flushing sorbate and/or the cooling sorbate may be generated during an oxygen separation period. According to an embodiment the step of guiding a cooling sorbate through the oxygen separation device 12, 14 may be performed before starting an oxygen separation cycle and thus directly after turning an oxygen separation device on and thus particularly after a certain storage time at elevated temperatures, as a first measure after an off-time of the oxygen separator.

For example, a small part of the oxygen enriched gas that is generated during former operation and which is stored in the accumulator 54 may be used as gas with lower heat of adsorbance and thus as cooling sorbate. For this purpose, the valves 50, 52, 74, 76 may be opened respectively in order to guide the oxygen through the oxygen separation device 12 and/or 14 for a few seconds, for example. The valves 50, 52 and 53 may be closed during off-time of the oxygen separator 10.

A method like described above performed on an oxygen separator 10 like described above may come up with a significant decrease of a zeolite bead temperature, for example, at a start of an oxygen separation process. This can be deduced from the simple experiments performed on a specially designed sieve cylinder with adapted thermocouples to measure the bead temperature. This is shown in FIG. 2.

Figure 2:
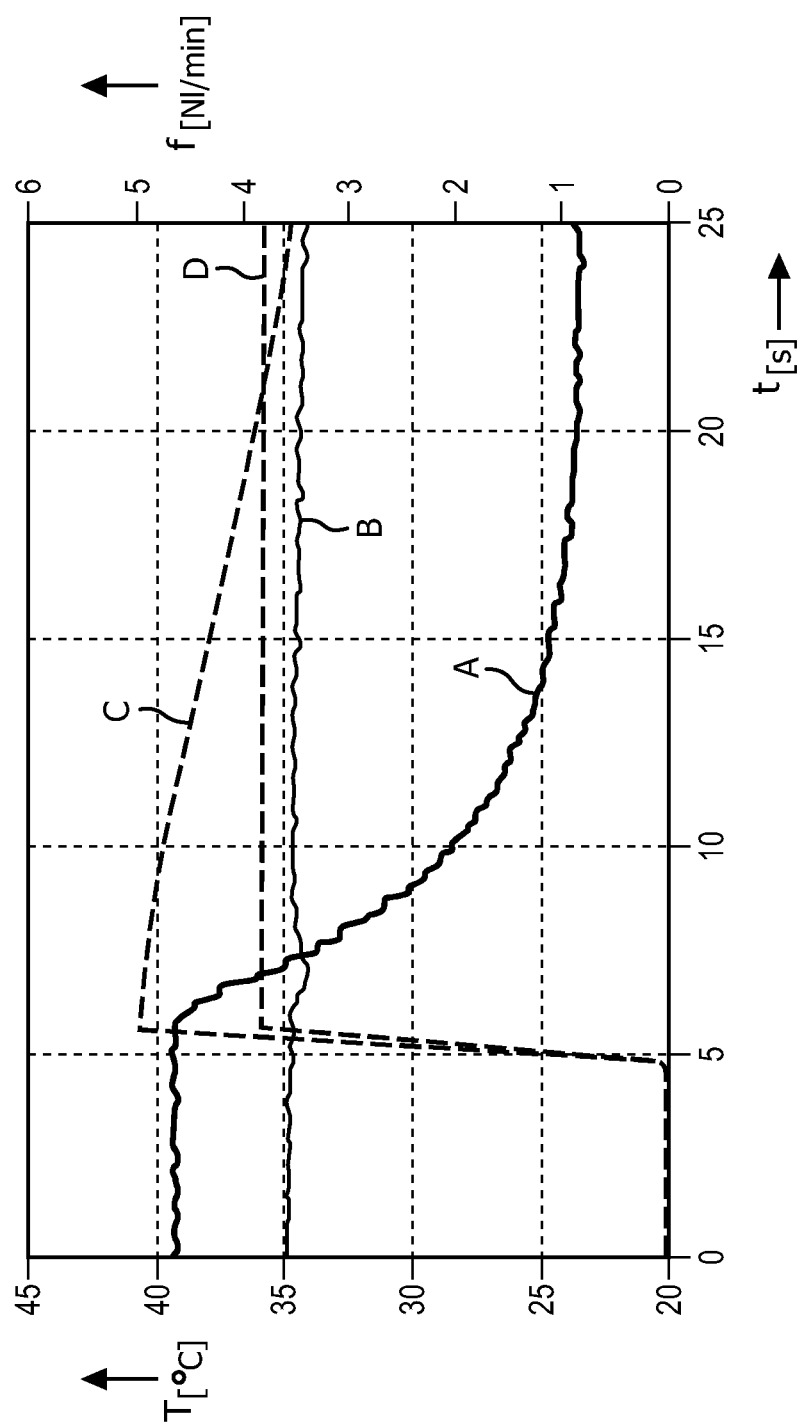
FIG. 2 shows a schematic diagram visualizing the effect of the method according to the invention.

FIG. 2 shows the result of a typical experiment. For this experiment a thermo-couple has been placed within a sieve material within a cylinder of an oxygen separation device in about 1 cm distance from the feed side. For the used Li-sieve material (SXSDM) and the diameter of the cylinder of about 22 mm (length of 155 mm), this temperature measurement characterizes the behavior of about 5 g of sieve material. The sieve material was flushed with nitrogen before every experiment. The results obtained for using nitrogen or oxygen as feed gas are shown in FIG. 2.

In detail, FIG. 2 is a diagram showing the time t in seconds (t[s]) against the temperature T in ° C. (T[° C.]) and the flow f in standard liters per minute (f [Nl/min]). Within this diagram, four curves are shown of which curve A demonstrates the temperature of the Li-sieve material for the flow of oxygen through the sieve, curve B demonstrates the temperature for the flow of nitrogen through the sieve, curve C demonstrates the oxygen flow and curve D demonstrates the nitrogen flow. For example, the temperature development at about 1 cm inside of the sieve material for given flows (curves C and D) may be seen. Therefore, the situation of oxygen purging (curves A and C) and nitrogen purging (curves B and D) for a sieve cylinder is shown. It is significant that after starting the feed flow, on the time scale of a few seconds the temperature decreases significantly (>10° C.) if oxygen is used as feed. This demonstrates the step of guiding a cooling sorbate through the oxygen separation sorbent 16, 18. Using nitrogen as feed, the temperature stays constant.

A simple estimate of possible temperature decrease is as follows. Just for sieve beds with small amount of sieve material and thus a quick oxygen transport from an input towards an output of the sieve bed at increased temperatures with an increased exchange rate of nitrogen by oxygen, temperature decrease is very fast, for example within a few seconds. As exemplary values only, by using 1.2 bar of cooling sorbate and a flow of about 4.5 Nl/min, a temperature decrease of about 15K may be achieved within less than 10 s by exchanging nitrogen by oxygen.

Figure 3:
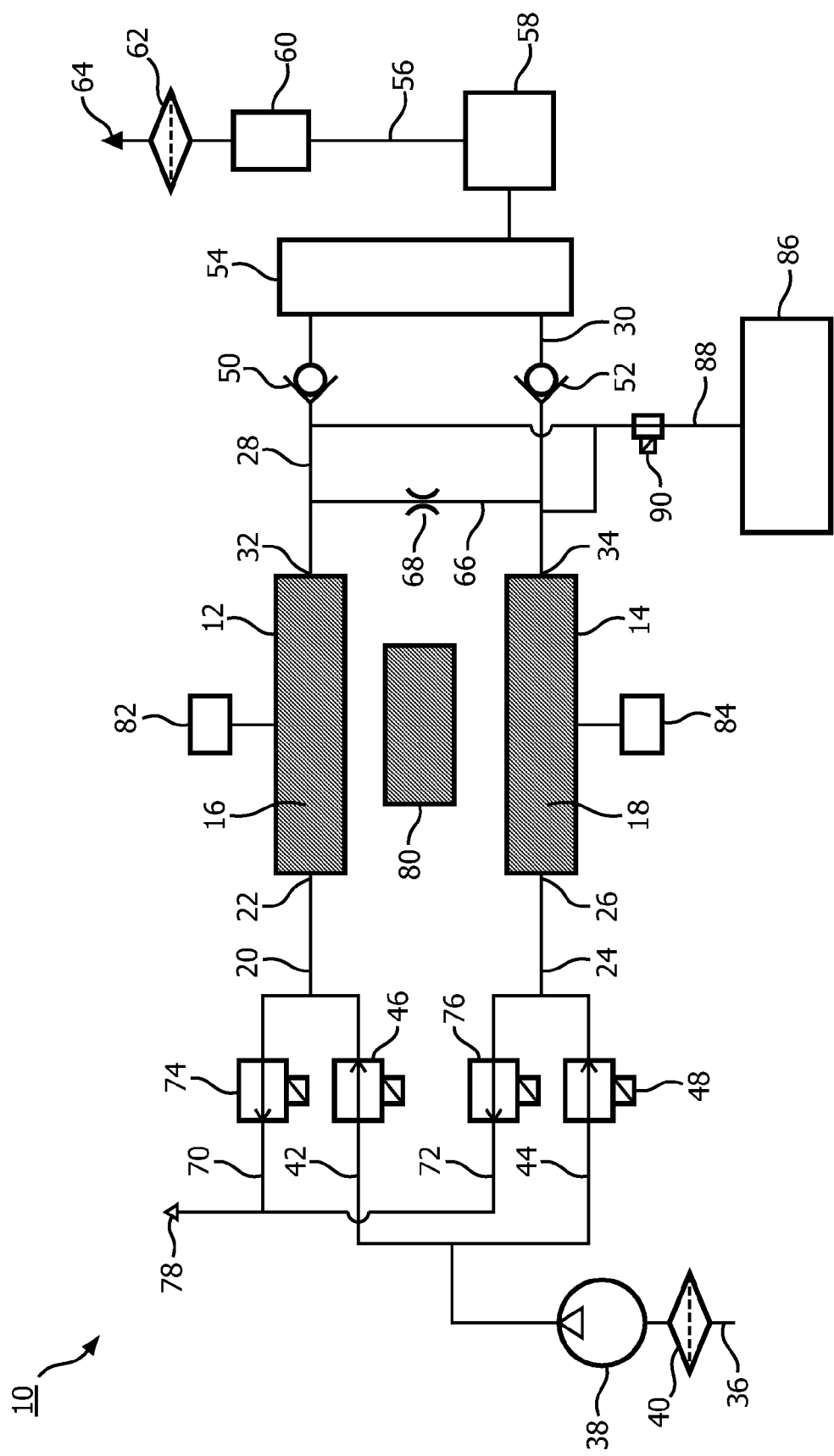
FIG. 3 shows a schematic view of a further embodiment of an oxygen separator according to the invention for performing the method according to the invention.

In FIG. 3, a further embodiment of an oxygen separator 10 according to the invention is schematically shown. With regard to FIG. 3, the same numerals refer to the same or comparable features compared to FIG. 1, because of which mainly the differences are discussed down below.

According to FIG. 3 the oxygen separator 10 comprises a further container 86 for accommodating the cooling sorbate. The container 86 is connected to the outlet conducts 28, 30 upstream the valves 50, 52 via a cooling line 88 in which a valve 90 is provided. The valves 50, 52 may in this case be designed as check valves.

A respective container may be present for the flushing sorbate, if needed. The further container for the flushing sorbate may, for example, be provided on the feed side of the oxygen separation devices 12, 14, particularly connected to the conducts 70, 72 by a respective valve. The respective containers may be filled like describe below, or they may be detachable and thus designed as exchangeable devices allowing adapting the used sorbates for respective applications.

Particularly, during an oxygen separation step, a part of the generated oxygen may be filled into the container 86. For example, in case a defined amount of cooling sorbate, such as oxygen, is present in the container 86, which may be detected by the pressure inside the container 86 via a pressure sensor or alternatively by a flow controller, the valve 90 may be closed. The method according to the invention may be performed as mentioned before with respect to the oxygen accumulator 54, wherein the container 86 exchanges the accumulator 54 and the valve 90 may exchange the valves 50, 52.

Additionally, it has to be noticed that for the reason of filling the container 86, for example, the energy consumption is negligible. It may therefore be preferred that the compressor 38 is operated with higher pressure in order to fill the container 86 more quickly. Additionally, it may be preferred that the filling of the container 80 may be performed in a longer time scale compared to half a cycle of a PSA process like described above.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. Method of separating oxygen from an oxygen comprising gas, the method comprising the steps of:
   performing at least a first and a second period of oxygen separation, the first and the second period of oxygen separation each comprising the steps of guiding an oxygen comprising gas to the primary side of an oxygen separation device, the oxygen separation device comprising an oxygen separation sorbent, and generating a flow of oxygen enriched gas out of the oxygen separation device by creating a pressure difference between the primary side and the secondary side of the oxygen separation device, and
   performing a cooling period between the first and the second period of oxygen separation, wherein the cooling period comprises the steps of
   guiding a flushing sorbate through the oxygen separation device, the flushing sorbate having an adsorption energy $e_1$ with respect to the oxygen separation sorbent, and
   guiding a cooling sorbate through the oxygen separation device, the cooling sorbate having an adsorption energy $e_2$ with respect to the oxygen separation sorbent,
   wherein the adsorption energy $e_2$ is lower with respect to the adsorption energy $e_1$, and
   wherein the step of guiding the flushing sorbate through the oxygen seperation device and/or the step of guiding the cooling sorbate through the oxygen separation device is performed in dependence of the oxygen separation sorbent temperature.

2. Method according to claim 1, wherein the flushing sorbate comprises nitrogen and/or wherein the cooling sorbate comprises oxygen, or rare gases.

3. Method according to claim 1, wherein the flushing sorbate and/or the cooling sorbate are generated during an oxygen separation period and/or during a cooling period.

4. Method according to claim 1, wherein the step of guiding the flushing sorbate through the oxygen separation device, and the step of guiding a cooling sorbate through the oxygen separation device are separated by an off-period.

5. Method according to claim 1, wherein the oxygen separation sorbent is loaded with flushing sorbate in an amount of more than 3 wt.-‰.

6. An oxygen separator, comprising
at least one oxygen separation device with an oxygen separation sorbent, having a gas inlet at a primary side for guiding a flow of oxygen comprising gas into the oxygen separation device and having a gas outlet at a secondary side for guiding a flow of oxygen enriched gas out of the oxygen separation device, and
a pressure adjusting device for creating a pressure difference between the primary side and the secondary side of the oxygen separation device, wherein
the oxygen separator comprises a control unit being adapted for guiding a flushing sorbate through the oxygen separation device between two oxygen generation periods and in dependence of the oxygen separation sorbent temperature, the flushing sorbate having an adsorption energy $e_1$ with respect to the oxygen separation sorbent, and being adapted for guiding a cooling sorbate through the oxygen separation device, between two oxygen generation cycles and in dependence of the oxygen separation sorbent temperature, the cooling sorbate having an adsorption energy $e_2$ with respect to the oxygen separation sorbent, wherein the adsorption energy $e_2$ is lower with respect to the adsorption energy $e_1$.

7. Oxygen separator according to claim 6, wherein the oxygen separator comprises a sensor for detecting the temperature of the oxygen separation sorbent.

8. Oxygen separator according to claim 6, wherein the oxygen separator comprises a container for accommodating the flushing sorbate and/or a container for accommodating the cooling sorbate.

9. Oxygen separator according to claim 6, wherein the oxygen separation sorbent comprises a Li-LSX zeolite.

* * * * *